US007996287B2

(12) United States Patent
Hamilton, II et al.

(10) Patent No.: US 7,996,287 B2
(45) Date of Patent: Aug. 9, 2011

(54) ALLOCATING CARBON OFFSETS FOR PRINTING TASKS

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/138,761

(22) Filed: Jun. 13, 2008

(65) Prior Publication Data

US 2009/0313145 A1 Dec. 17, 2009

(51) Int. Cl.
*G07B 17/00* (2006.01)
(52) U.S. Cl. .............. 705/30; 705/7; 705/402; 713/300; 700/90; 358/1.9; 715/764; 101/183
(58) Field of Classification Search .................... 705/30, 705/7, 317; 358/1.9, 159; 715/764; 101/183
See application file for complete search history.

(56) References Cited

U.S. PATENT DOCUMENTS

| 6,732,055 | B2 | 5/2004 | Bagepalli et al. | |
|---|---|---|---|---|
| 7,339,688 | B1 | 3/2008 | Baba et al. | |
| 2001/0003955 | A1* | 6/2001 | Mayer et al. | 101/183 |
| 2005/0231758 | A1* | 10/2005 | Reynolds | 358/1.15 |
| 2006/0089851 | A1* | 4/2006 | Silby et al. | 705/1 |
| 2007/0233616 | A1 | 10/2007 | Richards et al. | |
| 2007/0255457 | A1 | 11/2007 | Whitcomb et al. | |
| 2007/0260405 | A1 | 11/2007 | McConnell et al. | |
| 2007/0265897 | A1 | 11/2007 | McMorris et al. | |
| 2007/0294102 | A1 | 12/2007 | McMorris et al. | |
| 2009/0076196 | A1* | 3/2009 | Hojaji | 524/2 |
| 2009/0204916 | A1* | 8/2009 | Benedek et al. | 715/764 |
| 2009/0287806 | A1* | 11/2009 | Hamilton et al. | 709/223 |
| 2010/0116135 | A1* | 5/2010 | Avina | 95/108 |

FOREIGN PATENT DOCUMENTS

WO 03060689 7/2003

* cited by examiner

*Primary Examiner* — Vanel Frenel
(74) *Attorney, Agent, or Firm* — Patrick J. Daugherty; Driggs, Hogg, Daugherty & Del Zoppo Co., LPA

(57) ABSTRACT

Methods, services, program products and devices are provided for correlating carbon offsetting and printing. Methods comprise a requester initiating a print job on a printing device; analyzing the print job; identifying at least one print job metric relevant to the print job as a function of the analyzing, the metric associated with a carbon offset value; calculating a total amount of carbon offset from the identified at least one metric; printing the print job; and transferring the carbon offset total amount to a carbon offsetting entity for debiting or crediting against a printing entity as a function of the printing. Systems and devices and articles of manufacture comprising a computer usable medium having a computer readable program in said medium are provided. Service methods comprise deploying applications for correlating carbon offsetting and printing.

18 Claims, 2 Drawing Sheets

ALLOCATING CARBON OFFSETS FOR PRINTING TASKS

FIELD OF THE INVENTION

The present invention generally describes methods, systems and devices for automatically correlating, calculating and allocating carbon offset credits or debits to a user for specific printing configurations and tasks.

BACKGROUND OF THE INVENTION

Computer and associated peripheral device usage generally consumes energy and, depending on the energy source, such usage may also increase greenhouse gas emissions. Green computing sometimes refers to the study and practice of using computing resources efficiently, and typically technological systems or computing products that incorporate green computing principles take into account economic viability, social responsibility and environmental impact. Green computing also may encompass efforts to effectively minimize environmental and resource impact from using computer resources to accomplish a task.

Both the governmental and private information technology industry stakeholders have recognized the importance of efficient computing methods and processes in reducing greenhouse gas emissions resulting from energy or power consumption required to accomplish computing tasks. Governmental and commercial initiatives exist that identify environmentally conscious computing system programs and applications as well as efficient associated appliances, computing system components. For example, it is known for manufacturers of computer peripheral devices and other appliances to participate in the Energy Star program of the United States Environmental Protection Agency, wherein the expected energy usage required by a device for performing one or more specified tasks are computed and communicated to consumers in relation to that of other comparable devices. An intent of the Energy Star program is to enable informed consumers to select more efficient devices from multiple devices available in the market place, with the expectation that the consumer will elect to save money and energy (and also cause less emissions impact over the useful life of a device) by choosing more efficient devices. However, consumers are given little guidance or incentive on using selected devices themselves in an efficient manner. Though a device may be highly-rated relative to other devices for power efficiency, such advantages may be wasted if used without concern for or knowledge of efficient implementations.

Carbon offsetting is another method useful in addressing environmental concerns, and generally refers to quantifying amounts of greenhouse gas reductions achieved by the actions (or even the inactions) of device users and others, thus mitigating or offsetting greenhouse gas emissions caused by others. In one aspect, users whose actions or inactions are deemed to result in an overall mitigation of greenhouse gas emissions are proportionally rewarded through carbon trading credits or other means that may be translated into direct economic benefits. Carbon offsetting enables mitigation of current or future greenhouse gas emissions through a variety of methods, often through quantifying an emission or mitigation activity with respect to an amount of greenhouse gas that the activity adds to or removes from the atmosphere. In one example, purchasers of airline tickets may also pay a surcharge or separate payment to pay for the planting of trees, wherein the trees planted are believed to remove greenhouse gases over their lifespan, thereby mitigating greenhouse gases generated by the purchased air travel. However, carbon offsetting opportunities within computing technology application are generally unknown or limited to gross and large-scale energy usage issues, for example considering the amount of energy consumed by a server farm on a per day basis. Opportunities for carbon offsetting directly related to specific functions or operations of specific computing devices and tasks as initiated and utilized by a typical user are not available or comprehended by the prior art, and thus users are not able to accurately utilize carbon offsetting on a device-by-device or task-by-task basis, rendering carbon offsetting of little use in assuring the efficient implementation of individual computing devices.

SUMMARY OF THE INVENTION

Methods, services, program products and devices are provided for correlating carbon offsetting and printing. Methods comprise a requester initiating a print job on a printing device; analyzing the print job; identifying at least one print job metric relevant to the print job as a function of the analyzing, the metric associated with a carbon offset value; calculating a total amount of carbon offset from the identified at least one metric; printing the print job; and transferring the carbon offset total amount to a carbon offsetting entity for debiting or crediting against a printing entity as a function of the printing.

In another aspect, service methods are provided comprising deploying applications for correlating carbon offsetting and printing according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for correlating carbon offsetting and printing. Moreover, systems, articles and programmable devices configured for performing one or more method and/or process elements of the current invention as also provided for correlating carbon offsetting and printing, for example as described above, are also provided.

BRIEF DESCRIPTION OF THE DRAWINGS

These and other features of the methods, systems and devices for carbon offsetting will be more readily understood from the following detailed description of the various aspects of the embodiments taken in conjunction with the accompanying drawings in which.

Figure 1:
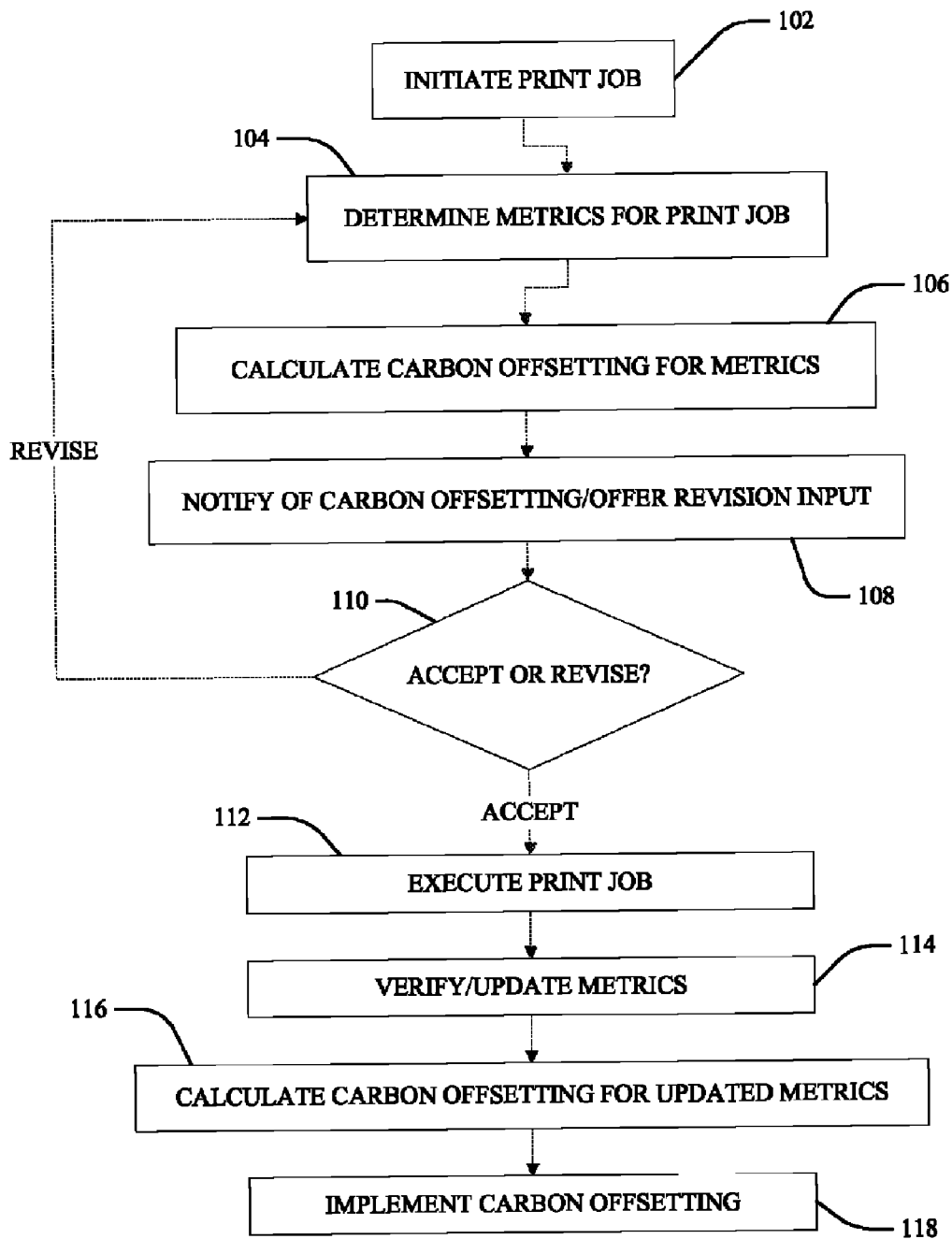
FIG. 1 is a flow chart illustrating a method and system for correlating carbon offsetting and printing according to the present application.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description
II. Computerized Implementation

I. General Description

FIG. 1 illustrates a method or system for correlating carbon offsetting and printing according to the present application. At 102 a user or program initiates a printing task, for example sending a print job to a printer queue through a computer application or requesting one or more copies of an original document through a photocopier control panel; other examples of printing will be apparent to one skilled in the art. At 104 the print job is analyzed to identify metrics of the print job relevant to carbon offsetting opportunities, and at 106 a quantified amount of carbon offset associated with the print job metrics determined at 104 is calculated.

In some embodiments, such as the embodiment illustrated in FIG. 1, at 108 a print job requester or other user is presented with an opportunity to participate in the process through direct inputs, for example by notifying the user of the current carbon offset quantified at 104. At 110 the user is thus enabled to accept or verify the current print job metrics or quantified carbon offset, or to request or specify one or more revisions to the same and thereby instigate a new iteration of metric and carbon offset calculations and notification and revision opportunities at 104-106-108-110. Current or revised print job metrics or amounts of carbon offsetting options may thus be obtained, and examples include debits authorized for the print job/metrics or an amount of mitigation credits to be achieved, in some examples by further option selections. Thus, an amount of carbon offset may be accepted, revised or specified by the user at 110, for example through using a conventional printer options panel on the device (e.g. as an option presented in a photocopier panel interface utilized for controlling other aspects of a copy job such as a number of copies, duplex settings, etc.), through a computer client application dialog box (e.g. an option in a print dialog box evoked within a word processing application when printing of a document is requested), and other user interface and option input methods and mechanisms will be apparent to one skilled in the art.

At 112 the print job is executed pursuant to the print job metrics finalized at 110, and at 114 the print job metrics of the executed print job are verified or revised. For example, subsequent to execution of the print job a user may receive recycling credits for recycling all or a portion of the print job or other recyclable material. In one embodiment, printed pages may be discarded into a smart garbage/recycling pail or bin, with quantified carbon offset values automatically revised (for example, a quantified carbon offset value decreased) by the smart pail in proportion to the number of pages dropped in by the print job user/requester. In another embodiment, the user may declare via the interface any recycling options taken. If the metrics are revised/updated at 114 then the carbon offset is recalculated at 116, and the carbon offset as quantified at 106 and verified at 110 or as recalculated at 116 is implemented at 118.

Implementation at 118 may comprise transferring the quantified/updated carbon offset to a third party or other service provider for offsetting operations. For example, a company that plants trees for carbon sequestration or companies that make technological investments intended to reduce emissions may be directly authorized through a preexisting agreement with the user or other entity associated with the method and process of FIG. 1 to achieve the quantified carbon offset on a fee-for-services or fee-for-cost of implementation basis, and other types of service provider relations and fee arrangements will be apparent to one skilled in the art.

Thus, in one embodiment, a computer means (e.g. an application, client or server) requesting the printing job may execute a program that collects metric data about the print job at 104, calculates a carbon offset at 106/116 and transmits the offset to a commercial offset provider over a network at 118. In another embodiment, a computer means may also collect the print job metrics at 104 and transmit the metrics to a third party for calculation of the quantified carbon offset values at 106-116; the third party may be a carbon offset provider itself, or another entity which has additional information that may be applied to the function for calculating the carbon offset at 106-116.

In some embodiments, a printing device itself may be networked and directly transmit print job metrics or carbon offset information to a provider. Metrics and calculations may also be updated according to instructions received from a provider over a network, for example via firmware or software updates, via physical replacement of device modules, and other update mechanisms. In some embodiments, a user may set preferences for automating user decisions, such as accepting or revising print job metrics or a quantified carbon offset at 110. For example, a user may set a preference to accept all at 110, or to revise all at 110 with an increase or decrease by a percentage. In such embodiments, the notification at 108 may be suppressed.

Figure 2:
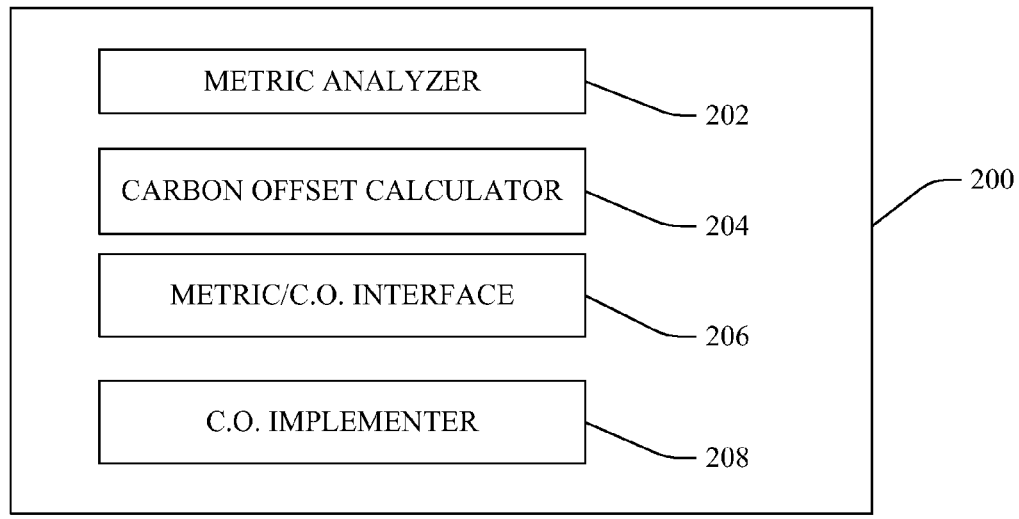
FIG. 2 is a block diagram of a programmable device configured to correlate carbon offsetting credits and printing metrics according to the present application.

FIG. 2 illustrates a programmable device configured to correlate carbon offsetting credits and printing metrics according to the present application. The device thus comprises a print job metric logic component 202 configured to enable the programmable device 200 to analyze the print job to identify metrics of the print job relevant to carbon offsetting opportunities. A carbon-offset calculator logic component 204 enables the device 200 to quantify an amount of carbon offset associated with the print job metrics determined by the print job metric logic component 202. A user interface module 206 enables the device to engage the user, for example to enable the user to accept or verify the current print job metrics or quantified carbon offset, or to request or specify one or more revisions to the same and thereby instigate a new iteration of metric and carbon offset calculations by the print job metric logic component 202 or the carbon-offset calculator logic component 204. A carbon offset service provider interface module 208 further enables the device to communicate directly with a third party, for example enabling transferring of quantified/updated carbon offsets or print job metrics to a service provider or other third party for implementing carbon offsetting operations or notifications according to the present application.

Embodiments of the present invention may be applied in a variety of settings, including traditional home and office printing settings, small-scale print-on-demand services for books and journals and digital photos, and traditional offset printing and large-capacity print jobs services, for example in the printing of electric, phone, and other utility bills, and for the printing of product packaging, for and by large commercial entities through the use of large, high-speed/high-volume production printers. It will be apparent that advantages provided by the present invention in providing for carbon offsetting opportunities may be proportional to the scale of the print job implementation, and thus advantages may be realized in large-scale production printer applications.

Metrics observed or determined at 104 for calculating carbon offsets may include data points accumulated from the initiation of a printing task at 102 through its completion at

112 (FIG. 1). Calculating a quantified carbon offset, for example at 116 (FIG. 1), may comprise ascertaining a total carbon offset associated with a print job request by collecting metrics both internal and external to execution of the printing task by a specified printing device. Examples of print job metrics include a user-specified degree of carbon offsetting, a number of paper sheets printed in executing the print job, paper and ink/toner types, and energy associated with executing the printing task, and other metrics appropriate for practicing the present invention will be apparent to one skilled in the art.

More particularly, a user may specify a degree of percentage of carbon offsetting to apply for each printing task, for example enabling users to selectively control a degree or percentage recognized of a possible total amount in mitigating their computational carbon consumption. In some embodiments, determining quantified carbon offsets, for example at 106 or 116 as illustrated in FIG. 1 and described above, may also be a function of requester or printing entity identity. For example, a production printer may recognize that a first client company is more interested in environmental stewardship, and generally requests or has requested achievement of greater carbon offsets than another second client company for print jobs having similar metrics. Accordingly, a print job request from the first client will result in a larger quantified carbon offset charge for the same print job metrics than a request from the second client. Further, in other embodiments users may be enabled to limit or cap their total offset remuneration charges, for example per hour, day, week, month or year; in one aspect this may enable improved and predictable budgeting of carbon offsetting costs by a user.

Metrics for paper attributes may include an amount of paper printed. In one aspect generating paper supplies for printing may have a direct negative impact on trees, and thus a computer application or means initiating the print task may track a number of pages printed in executing the print job and input this amount directly as a metric update at 114 (FIG. 1), in some instances as first reduced by an amount of paper or other resource item recycled by the user. Similarly, the use of duplex or multi-page per printed page printing options may be recognized in print job metrics, generally triggering smaller carbon offset quantification in proportion to paper usage reductions.

The type of paper consumed in executing the print job may also serve as a metric; for example, as it may be determined that less greenhouse gasses are generated in making recycled, non-bleached or other certain types of paper, each specific paper type may have a different type metric, with usage of types using less carbon in generation or otherwise less harmful to the environment resulting in lower carbon offsetting charges levied for printing the print job. In some embodiments, paper types and/or environmental impact ratings may be associated with loaded printer paper and provided to a processing means configured to execute the methods and processes according to the present application, for example stored within radio frequency identification (RFID) tags, barcodes or other unique number code means located on the paper packaging and read by an appropriate scanning means. Thus, in one example, when loading new paper a printer may automatically read an associated RFID, barcode or number code from the paper packaging, and/or request a user input of same if automatic means are not available or able to input the data, for example as input by a user on a keypad or through a dialog box.

Metrics may also comprise type or amounts of ink or toner consumed. Recycled ink/toner may be created using less carbon-intensive processes or generating less greenhouse gasses, and ink/toner made without one or more certain chemicals may also use less carbon or be less harmful to the environment. Executing a draft or other lighter-printout print configuration may also result in a lower quantified carbon offset compared to a conventional print job request. In some embodiments, an ink/toner type and/or its environmental impact data may be stored on storage means accessible by applications according to the present invention, for example as read from a RFID, barcode or other number code located on a ink/toner cartridge and read by a printer device scanning/reader means or input manually by a user; thus, in response to loading new ink/toner or selecting a specific ink/toner from a plurality of choices, a printer configured according to the present application may read the associated RFID, barcode or number code from the cartridge and provide/recognize the appropriate ink type metric. The amount of ink used to print the print job may also be determined by querying ink/toner levels before and after printing the print job, thus resulting in more favorable metrics when light-printing configurations are selected. In some embodiments, an ink/toner cartridge may provide an electrical contact interface, wherein information about the ink/toner and its carbon impact, etc., as well as amount used for any given print job or portion thereof, may be accessed via connection to the electronic interface contacts through pin or other connectors.

Thus, in one aspect, methods and processes of the present invention may enable printer users to efficiently and accurately offset the carbon use associated with their print jobs at a high level of granularity, in some examples enabling users to use data analysis to identify which of a plurality of metrics offers the best or most efficient opportunities for maximizing or optimizing and correspondingly reducing the carbon footprint of their print jobs. The present invention may thus provide objective data and direct economic carbon offsetting benefit incentives that persuade users to favor printer configurations and tasks that consume fewer resources and result in a smaller global environmental impact from printing.

II. Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. Thus, embodiments of the present invention comprise methods, apparatus (e.g. systems, devices, etc.) and computer program products. For example, it will be understood that each block of the flowchart illustrations and/or block diagrams of the figures, including FIGS. 1 and 2 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIGS. 1 and 2, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
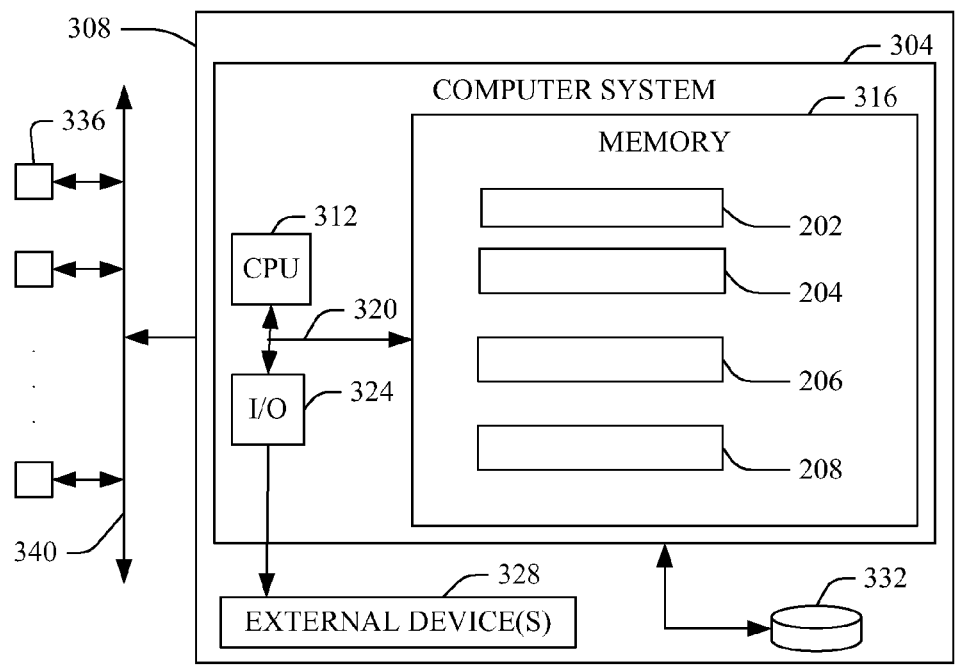
FIG. 3 is a block diagram illustrating a computerized device implementation for correlating carbon offsetting and printing according to the present application.

Referring now to FIG. 3, an exemplary computerized implementation includes a computer system 304 deployed within a computer infrastructure 308, such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for implementing power savings on client-side computational devices as illustrated in FIGS. 1 and 2 and described above, for example including the print job metric logic component 202, the carbon-offset calculator logic component 204, the user interface module 206 and the carbon offset service provider interface module 208 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for correlating carbon offsetting and printing, comprising:
   providing a printing device in communication with a user through a user interface, wherein the printing device:
   identifies a metric of a print job initiated by the user through the user interface;
   calculates a carbon offset value for the print job as a function of the print job metric and a user-specified degree of carbon offsetting associated with the user and applicable to the printing job;
   displays the calculated carbon offset value in association with the print job to the user in the user interface;
   prints the print job in response to a direct input from the user through the user interface, wherein the user direct input comprises an acceptance or a revision of at least one of the print job metric and the carbon offset value associated with the print job displayed to the user in the user interface, and wherein the revision of the carbon offset value comprises:
   recalculating the calculated carbon offset value associated with the print job displayed to the user in the user interface in response to the user revising the print job metric or the applicable user-specified degree of carbon offsetting; or
   revising the calculated carbon offset value associated with the print job and displayed to the user in the user interface to a revised carbon offset value as specified by the user;
   determines a final carbon offset value of the printed print job as a function of the user direct input and the calculated carbon offset value or the recalculated calculated carbon offset value or the revised calculated carbon offset value; and
   transfers the determined final carbon offset value of the printed print job to a carbon offsetting entity.

2. The method of claim 1, wherein the user interface is a photocopier panel interface on the printing device, or a computer client application dialog box displayed to the user through a computer client application.

3. The method of claim 1 wherein the print job metric comprises at least one of a user-specified degree of carbon offsetting, a number of paper sheets printed in the printing the print job, a supply paper type, a printing toner type, an amount of toner consumed in the printing the print job, and an energy associated with the printing the print job.

4. The method of claim 3, wherein the printing device identifies the metric of the print job initiated by the user by:
reading a supply paper type metric code from a printer device paper supply packaging; or
reading a toner type metric code from a printer device toner cartridge.

5. The method of claim 1, wherein the printing device further determines the final carbon offset value of the printed print job as the function of the calculated carbon offset value and the user direct input by:
receiving a recycling activity input; and
lowering an initial determined carbon offset value for the printed print job to the final determined carbon offset value of the printed print job as a function of the recycling activity input.

6. The method of claim 5, wherein the print job metric is a number of pages of paper printed in printing the print job; and
wherein the recycling activity input is a number of pages of paper received from the user by an automated recycling bin in communication with the printing device.

7. The method of claim 1 wherein the carbon offsetting entity is a service provider that directly effects a carbon offsetting activity having a value equivalent to the final determined carbon offset value.

8. The method of claim 1, wherein the printing device selects the user-specified degree of carbon offsetting as a function of a user identity, wherein a first user-specified degree of carbon offsetting associated with a first user identity achieves a higher carbon offset value than a second user-specified degree of carbon offsetting associated with a second user identity for print jobs having similar print job metrics.

9. A system, comprising:
a processing unit, computer readable memory and a computer readable storage system;
first program instructions to identify a metric of a print job initiated by a user through a user interface and calculate a carbon offset value for the print job as a function of the print job metric and a user-specified degree of carbon offsetting associated with the user and applicable to the printing job;
second program instructions to display the calculated carbon offset value in association with the print job to the user in the user interface and print the print job in response to a direct input from the user through the user interface, wherein the user direct input comprises an acceptance or a revision of at least one of the print job metric and the carbon offset value associated with the print job displayed to the user in the user interface, and wherein the revision of the carbon offset value comprises
recalculating the calculated carbon offset value associated with the print job displayed to the user in the user interface in response to the user revising the print job metric or the applicable user-specified degree of carbon offsetting; or
revising the calculated carbon offset value associated with the print job and displayed to the user in the user interface to a revised carbon offset value as specified by the user; and
third program instructions to determine the final carbon offset value of the printed print job as the function of the user direct input and the calculated carbon offset value or the recalculated calculated carbon offset value or the revised calculated carbon offset value, and to transfer the determined final carbon offset value of the printed print job to a carbon offsetting entity; and
wherein the first, second and third program instructions are stored on the computer readable storage system for execution by the processing unit via the computer readable memory.

10. The system of claim 9, wherein the user interface is a photocopier panel interface, or a computer client application dialog box displayed to the user through a computer client application.

11. The system of claim 9, wherein the print job metric comprises at least one of a user-specified degree of carbon offsetting, a number of paper sheets printed in the printing the print job, a supply paper type, a printing toner type, an amount of toner consumed in the printing the print job, and an energy associated with the printing the print job; and
wherein the first program instructions are further to identify the metric of the print job initiated by the user by using a scanning means to read a supply paper type metric code from a printer device paper supply packaging, or to read a toner type metric code from a printer device toner cartridge.

12. The system of claim 9, wherein the third program instructions are further to determine the final carbon offset value of the printed print job as the function of the calculated carbon offset value and the user direct input by receiving a recycling activity input and lowering an initial determined carbon offset value for the printed print job to the final determined carbon offset value of the printed print job as a function of the recycling activity input.

13. The system of claim 12, wherein the print job metric is a number of pages of paper printed in printing the print job; and
wherein the recycling activity input is a number of pages of paper received from the user by an automated recycling bin in communication with the processing unit.

14. A computer program product for correlating carbon offsetting and printing, the computer program product comprising:
a computer readable storage medium;
first program instructions to identify a metric of a print job initiated by a user through a user interface and calculate a carbon offset value for the print job as a function of the print job metric and a user-specified degree of carbon offsetting associated with the user and applicable to the printing job;
second program instructions to display the calculated carbon offset value in association with the print job to the user in the user interface and print the print job in response to a direct input from the user through the user interface, wherein the user direct input comprises an acceptance or a revision of at least one of the print job metric and the carbon offset value associated with the print job displayed to the user in the user interface, and wherein the revision of the carbon offset value comprises:
recalculating the calculated carbon offset value associated with the print job displayed to the user in the user interface in response to the user revising the print job metric or the applicable user-specified degree of carbon offsetting; or
revising the calculated carbon offset value associated with the print job and displayed to the user in the user interface to a revised carbon offset value as specified by the user; and
third program instructions to determine a final carbon offset value of the printed print job as a function of the user direct input and the calculated carbon offset value or the recalculated calculated carbon offset value or the revised calculated carbon offset value, and to transfer the determined final carbon offset value of the printed print job to a carbon offsetting entity; and wherein the first, second and third program instructions are stored on the computer readable storage medium.

15. The computer program product of claim 14, wherein the user interface is a photocopier panel interface on a printing device, or a computer client application dialog box displayed to the user through a computer client application.

16. The computer program product of claim 14, wherein the print job metric comprises at least one of a user-specified degree of carbon offsetting, a number of paper sheets printed in the printing the print job, a supply paper type, a printing toner type, an amount of toner consumed in the printing the print job, and an energy associated with the printing the print job; and wherein the first program instructions are further to identify the metric of the print job initiated by the user by using a scanning means to read a supply paper type metric code from a printer device paper supply packaging, or to read a toner type metric code from a printer device toner cartridge.

17. The computer program product of claim 14, wherein the third program instructions are further to determine the final carbon offset value of the printed print job as the function of the calculated carbon offset value and the user direct input by receiving a recycling activity input and lowering an initial determined carbon offset value for the printed print job to the final determined carbon offset value of the printed print job as a function of the recycling activity input.

18. The computer program product of claim 14, wherein the first program instructions are to select the user-specified degree of carbon offsetting as a function of a user identity, wherein a first user-specified degree of carbon offsetting associated with a first user identity achieves a higher carbon offset value than a second user-specified degree of carbon offsetting associated with a second user identity for print jobs having similar print job metrics.

* * * * *